US012066064B2

(12) United States Patent
Rubel

(10) Patent No.: US 12,066,064 B2
(45) Date of Patent: Aug. 20, 2024

(54) FLEXIBLE SLEEVE COUPLING RADIAL TOOTH SUPPORT CAP AND METHOD

(71) Applicant: Dodge Industrial Inc., Oxford, CT (US)

(72) Inventor: James R. Rubel, Simpsonville, SC (US)

(73) Assignee: Dodge Industrial Inc., Oxford, CT (US)

(*) Notice: Subject to any disclaimer, the term of this patent is extended or adjusted under 35 U.S.C. 154(b) by 275 days.

(21) Appl. No.: 17/545,504

(22) Filed: Dec. 8, 2021

(65) Prior Publication Data

US 2022/0099146 A1 Mar. 31, 2022

Related U.S. Application Data

(62) Division of application No. 16/267,685, filed on Feb. 5, 2019, now Pat. No. 11,226,010.

(51) Int. Cl.
*F16D 3/72* (2006.01)
*F16B 11/00* (2006.01)

(52) U.S. Cl.
CPC .............. *F16D 3/72* (2013.01); *F16B 11/008* (2013.01); *Y10T 403/453* (2015.01); *Y10T 403/7026* (2015.01)

(58) Field of Classification Search
CPC ...... F16D 3/72; F16B 11/008; Y10T 403/453; Y10T 403/7026
USPC ........................................................ 464/156
See application file for complete search history.

(56) References Cited

U.S. PATENT DOCUMENTS

| 2,172,707 | A | 9/1939 | Julien |
| 2,867,102 | A | 1/1959 | Williams |
| 2,867,103 | A | 1/1959 | Williams |
| 5,595,541 | A | 1/1997 | Ducugnon |

FOREIGN PATENT DOCUMENTS

| GB | 1 532 553 | * 11/1978 |
| GB | 2 164 726 A | * 3/1986 |
| NO | 37861 | 3/1921 |

* cited by examiner

*Primary Examiner* — Greg Binda
(74) *Attorney, Agent, or Firm* — Ruggiero McAllister & McMahon LLC

(57) ABSTRACT

A system and method for increasing a tooth shear strength without also increasing a torsional rigidity of a flexible sleeve disposed between two hubs of a flexible coupling for transmitting mechanical motion between two shafts includes attaching a stiffening caps to both ends of a flexible sleeve, between the flexible sleeve and the hubs.

10 Claims, 7 Drawing Sheets

FLEXIBLE SLEEVE COUPLING RADIAL TOOTH SUPPORT CAP AND METHOD

CROSS REFERENCE TO RELATED APPLICATION

This application is a divisional application of and claims priority to commonly owned U.S. application Ser. No. 16/267,685, filed on Feb. 5, 2019, which issued on Jan. 18, 2022 as U.S. Pat. No. 11,226,010, the contents of which are incorporated herein by reference in its entirety.

FIELD OF THE INVENTION

The present disclosure relates to power transmission and, more particularly, to mechanical power transmission using flexible or yielding couplings.

BACKGROUND OF THE INVENTION

Elastomeric couplings for connecting driving and driven mechanical components, typically in the form of rotating shafts are known. Elastomeric couplings are uniquely suited for use in applications where shock, vibration, and misalignment may be present. In these types of couplings, driving and driven metal or otherwise stiff hubs are connected on either side of a transmission junction and are connected to one another using an elastomeric or yielding material such as EPDM, Neoprene, Hytrel®, and the like. In this way, the yielding material can provide flexing along three axes to accommodate torsional, angular, and parallel misalignment, and torque spikes and impact drive loads.

A few examples of such flexible sleeve couplings can be seen in U.S. Pat. Nos. 2,867,102 and 2,867,103 (the Williams references), which were filed in 1956 and 1957, respectively, and describe a flexible coupling for shafts and a gripping arrangement for flexible couplings for power transmission shafts. The types of couplings described in the Williams references are widely used in various industries, but their applications are not without known issues and limitations.

One known issue or limitation of known flexible sleeve couplings is that, during high torque or shock loading situations, the teeth along the outer and inner diameter of the sleeve element deform and roll underneath the opposing teeth of the connected hubs. In extreme conditions, such deformation results in an interruption in torque transmission when the teeth of the flexible element either shear off the element entirely or eject the element from the connected hubs. It has been proposed in the past to increase the stiffness of the elastomeric material such that higher torque loads can be carried. However, such stiffness increases, while possibly better suited to withstand higher torque loads than the baseline stiffness flexible sleeves, decrease the sleeve's flexing ability and, therefore, the coupling's ability to withstand misalignment.

SUMMARY OF THE INVENTION

In one aspect, the present disclosure describes a flexible coupling. The flexible coupling includes two hubs, each hub configured to engage a shaft along a central portion and engage a flexible sleeve along an engagement portion. The flexible coupling further includes a flexible member assembly disposed between the two hubs in engaged relation between the engagement portions of each of the two hubs. The flexible member assembly includes a flexible sleeve having a first end and a second end, a first stiffening cap attached to the first end of the flexible sleeve between the flexible sleeve and the engagement portion of one of the two hubs, and a second stiffening cap attached to the second end of the flexible sleeve between the flexible sleeve and the engagement portion of the other of the two hubs.

In another aspect, the present disclosure describes a flexible sleeve for use with a flexible coupling. The flexible coupling includes two hubs, each hub configured to engage a shaft along a central portion and engage the flexible sleeve along an engagement portion. The flexible sleeve further includes a first plurality of dowels attached to a first end of the flexible sleeve. The first plurality of dowels is adapted to be disposed between the flexible sleeve and the engagement portion of one of the two hubs of the flexible coupling. The flexible sleeve also includes a second plurality of dowels attached to a second end of the flexible sleeve. The second plurality of dowels is adapted to be disposed between the flexible sleeve and the engagement portion of the other of the two hubs.

In some embodiments, the engagement portion of each hub includes an inner row of teeth and an outer row of teeth concentrically disposed with one another with respect to a longitudinal axis. The flexible sleeve includes mating inner and outer rows of teeth formed at either axial end thereof. The inner and outer rows of teeth are adapted to mesh with the inner and outer rows of teeth of the engagement portion of each of the two hubs.

In some embodiments, the first plurality of dowels is part of a first stiffening cap and the second plurality of dowels is part of a second stiffening cap. Each of the first stiffening cap and the second stiffening cap includes a plate having a generally annular shape that extends at least partially around an inner periphery and an outer periphery of either axial end of the flexible sleeve. The first plurality of dowels is connected to the plate and arranged around and proximal the outer periphery. The second plurality of dowels is connected to the plate and arranged around and proximal the inner periphery.

In some embodiments, the flexible sleeve includes a first plurality of bores extending, one each, through the outer row of teeth of the flexible sleeve. The first plurality of dowels extends, one each, through the first plurality of bores. The flexible sleeve includes a second plurality of bores extending, one each, through the inner row of teeth of the flexible sleeve. The second plurality of dowels extends, one each, through the second plurality of bores.

In some embodiments, the flexible sleeve includes an adhesive disposed at least partially along interfaces between the first and second stiffening caps and the flexible sleeve.

In some embodiments, the first plurality of dowels and the second plurality of dowels extend symmetrically around the plate and on a same side of the plate parallel to one another.

In some embodiments, each of the first plurality of bores extends through a geometrical center of each of the outer row of teeth, and each of the second plurality of bores extends through a geometrical center of each of the inner row of teeth.

In some embodiments, each of the first plurality of dowels and the second plurality of dowels include one or more dowels having a non-circular cross section.

In some embodiments, the first plurality of dowels is part of a first stiffening cap and the second plurality of dowels is part of a second stiffening cap. Each of the first stiffening cap and the second stiffening cap includes a plurality of plate segments having a generally curved shape that includes an inner portion and an outer portion with respect to a radial direction that is transverse to the longitudinal axis. The first plurality of dowels is connected to the plurality of plate segments and located proximal to the outer portion. The second plurality of dowels is connected to the plurality of plate segments and located proximal to the inner portion. The plurality of plate segments are arranged to cover an entire periphery of an end face of the flexible sleeve.

In some embodiments, the first plurality of dowels is part of a first stiffening cap and the second plurality of dowels is part of a second stiffening cap. Each of the first stiffening cap and the second stiffening cap includes a plate having a generally annular shape that includes an inner periphery and an outer periphery, an outer peripheral wall extending along the outer periphery, and an inner peripheral wall extending along the inner periphery. The plate, the outer peripheral wall, and the inner peripheral wall of the first stiffening cap encapsulate the first end of the flexible sleeve. The plate, the outer peripheral wall, and the inner peripheral wall of the second stiffening cap encapsulate the second end of the flexible sleeve.

In yet another aspect, the disclosure describes a method for increasing a tooth shear strength without also increasing a torsional rigidity of a flexible sleeve disposed between two hubs of a flexible coupling for transmitting mechanical motion between two shafts. The method includes attaching a first stiffening cap to a first end of the flexible sleeve between the flexible sleeve and an engagement portion of one of the two hubs, and attaching a second stiffening cap to a second end of the flexible sleeve between the flexible sleeve and the engagement portion of the other of the two hubs.

DETAILED DESCRIPTION OF THE INVENTION

The present disclosure is directed to flexible sleeve couplings and, more particularly, to systems and methods for improving the couplings' ability to withstand torque loading variations without compromising their ability to handle misalignment during operation. Stated differently, the flexible couplings exhibit an improved resistance to torsional shear without also increasing their torsional rigidity. In the disclosed embodiments, structures are introduced to stiffen each tooth at either end of the coupling sleeve, along both the inner and outer diameters of the sleeve, by inserting and bonding or otherwise attaching a stud or dowel extending through a portion of each tooth, and/or by encapsulating the teeth in bonding relation to a liner. The studs or liners advantageously support the teeth and prevent excessive deformation, which allows for high torque transmission, without impacting the misalignment capabilities or the torsional stiffness of the sleeve coupling element. The increased torque capacity advantageously provides an opportunity to downsize the coupling size for a particular application, which can result in cost savings.

Previously proposed solutions to increasing torque transmission capacity of a coupling having a given size involve changing the base rubber formulation of the flexible sleeve to an overall stiffer formulation. However, the increased stiffness of the sleeve has been found to inversely effect misalignment capacity and torsional damping characteristics of the coupling. Additionally, stiffer sleeves have been found to increase the resultant load on the driven and driving equipment resulting in reduced equipment life.

Figure 1:
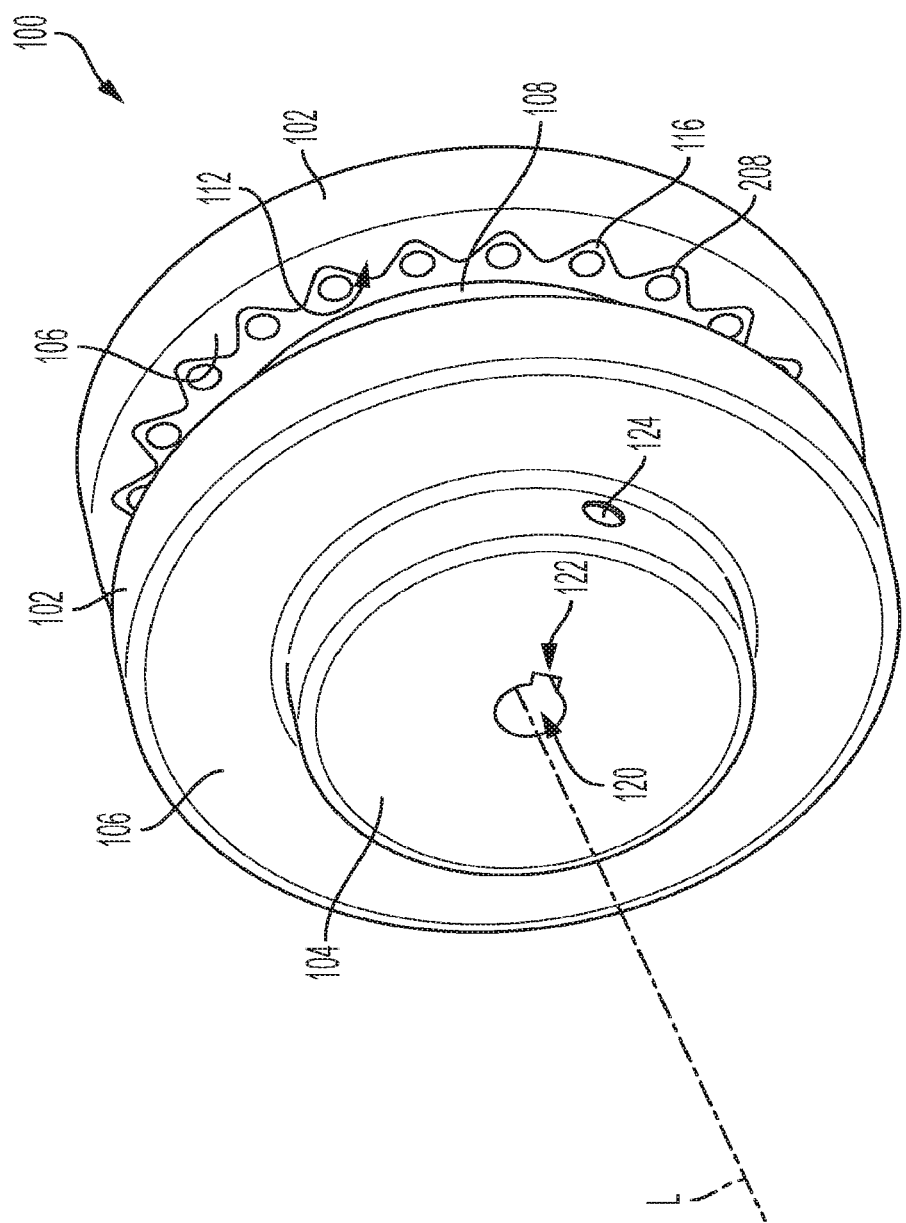
FIG. 1 is an outline view of a flexible sleeve coupling in accordance with the disclosure.
Figure 2:
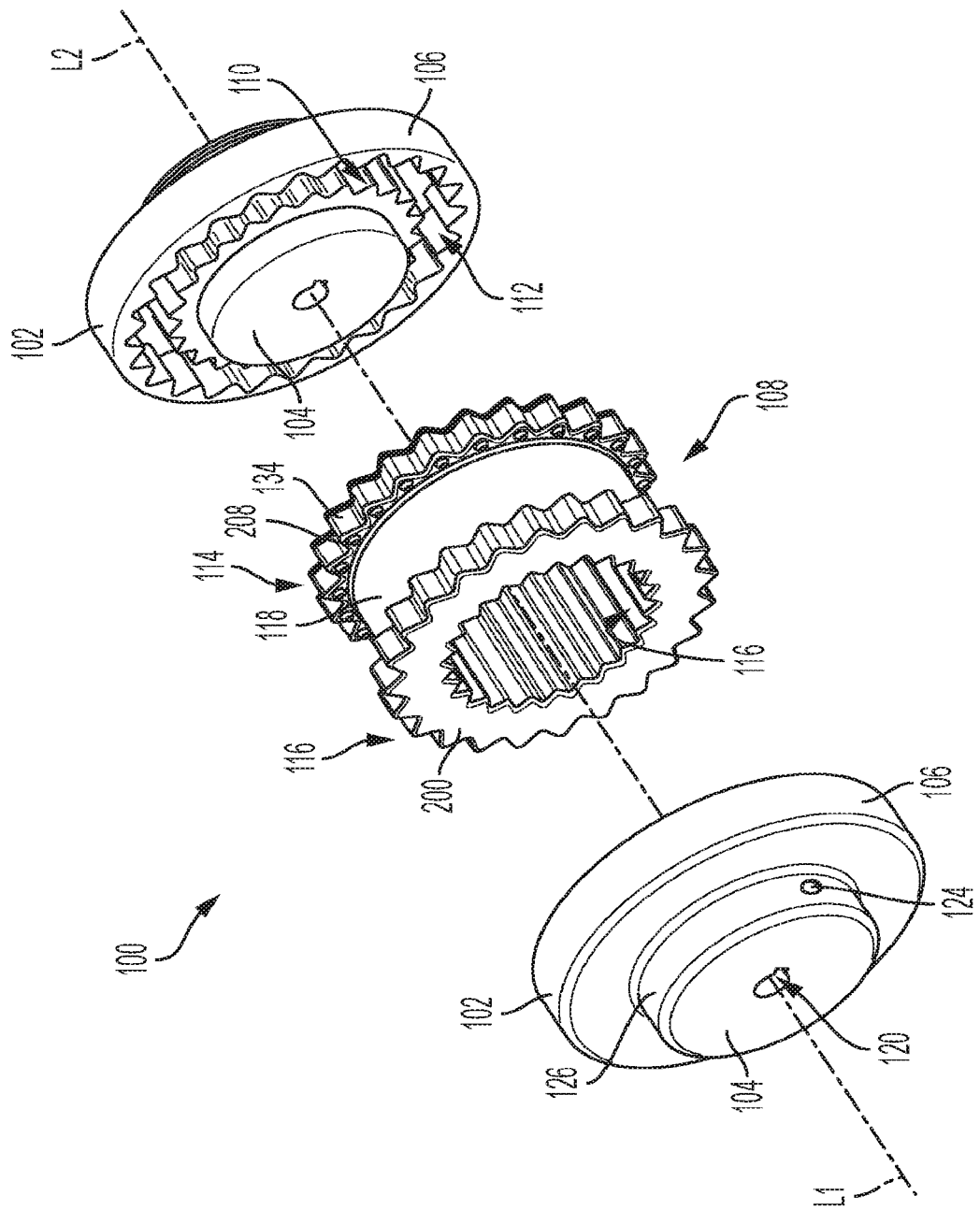
FIG. 2 is an exploded view of a flexible sleeve coupling in accordance with the disclosure.

An outline view of a coupling 100 in accordance with the disclosure is shown in FIG. 1 in an assembled state, and in an exploded state in FIG. 2 to illustrate certain internal structures thereof. The coupling 100 includes two hubs 102, each having a central portion 104 configured to engage a shaft (not shown) and an engagement portion 106 that is configured to engage toothed ends of a flexible member assembly 108. In the illustrated embodiment, the engagement portion 106 of each hub 102 includes an inner row of teeth 110 and an outer row of teeth 112 concentrically disposed with one another with respect to a longitudinal axis, L. The inner and outer rows of teeth 110 and 112 meshably engage corresponding inner and outer rows of teeth 116 and 114, respectively, formed at either axial end of a flexible sleeve 118 included in the flexible member assembly 108. The flexible sleeve 118 may have an overall length, M, in the axial direction.

Installed in the typical fashion, each hub 102 is installed close to an end of a shaft (not shown) through an axial opening 120 extending through the central portion 104 of the hub 102. In alternative embodiments, spacer hubs may also be used (not shown here) in the known fashion to mount the flexible coupling. In the illustrated embodiment, the axial opening 120 may include a key slot 122 and set screw 124 disposed in a bore extending through a shoulder portion 126 of the central portion 104. The two shafts onto which the hubs 102 are mounted may be two sides of a drive arrangement, for example, between a driving component such as a motor and a driven component such as a pump, drive shaft, conveyor, and the like. As is the often the case, the torque transmitted through the coupling 100 may include transient disturbances such as torque spikes, vibrations, and the like. Moreover, there may be a misalignment between the two shafts such that an axis L1 (FIG. 2) extending through one hub 102 may be misaligned and/or non-parallel with an axis L2 extending through the mating hub 102. The transient effects in the transmitted torque may be absorbed or otherwise dampened by the elastomeric or resilient material from which the flexible sleeve 118 is made. The flexible sleeve 118 can also flex and conform to the misalignment between the axes L1 and L2.

Figure 3:
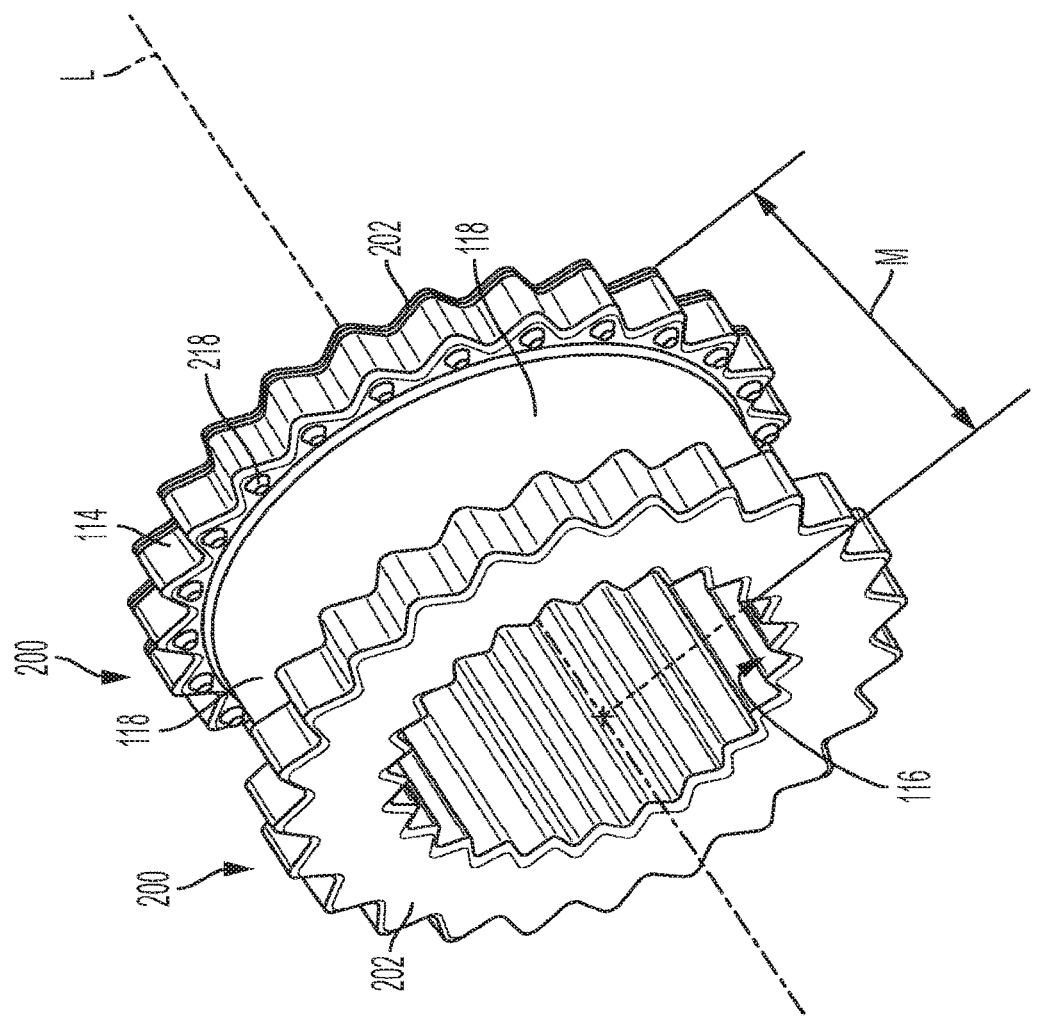
FIG. 3 is an outline view of a flexible sleeve having tooth support elements in accordance with the disclosure.
Figure 5B:
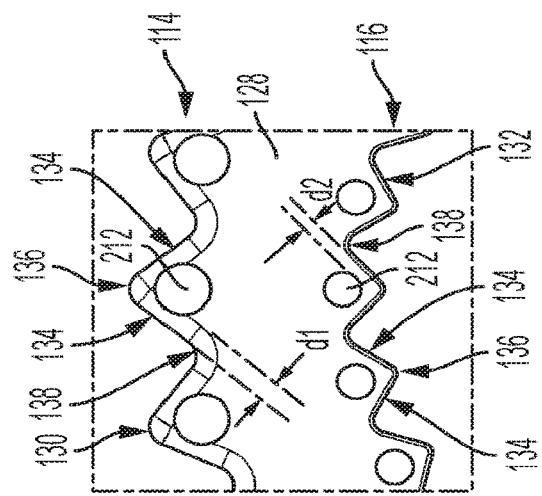
FIG. 5B is an enlarged detail view of a portion of FIG. 5A.
Figure 5A:
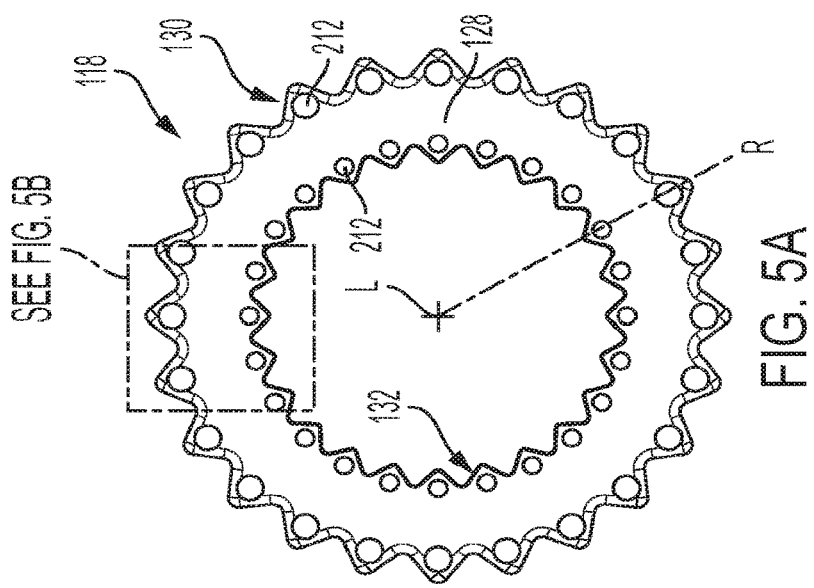
FIG. 5A is an outline view from a top perspective of a flexible sleeve in accordance with the disclosure.
Figure 4:
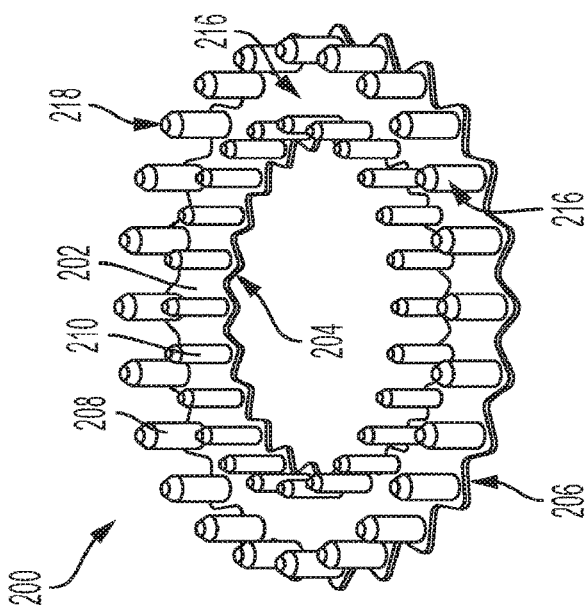
FIG. 4 is an outline view of a tooth support cap in accordance with the disclosure.

To increase the ability of the flexible sleeve 118 to transfer torque while maintaining its flexibility and, thus, its ability to conform to misaligned axes, a tooth support cap 200 is used in the embodiments shown in FIGS. 2 and 3. A disassembled view of the flexible sleeve 118 and the tooth support cap 200 is also shown in FIGS. 4 and 5. In reference to these figures, the tooth support cap 200 includes a plate 202 having a generally annular shape that includes an inner periphery 204 and an outer periphery 206 (FIG. 4). A first plurality of dowels 208 is integrally formed or otherwise connected to the plate 202. The first plurality of dowels 208 are connected at one end to the plate 202 and extend symmetrically around the plate adjacent the outer periphery 206. A second plurality of dowels 210 is also integrally formed or otherwise connected to the plate 202. The second plurality of dowels 210 are also connected at one end to the plate and extend symmetrically around the plate adjacent the inner periphery 204.

As can be seen in FIG. 4, the dowels belonging to the first and second pluralities of dowels 210 and 208 extend parallel to one another and have generally the same length in the exemplary embodiment shown. As can be appreciated, however, the dowels 210 and 208 may have different lengths. For example, the dowels 210 may be longer and extend deeper into the flexible coupling adjacent the inner periphery 204 than the outer dowels 208. In this embodiment, the dowels have a circular cross section that results in a cylindrical shape for each dowel. The first and second pluralities of dowels 210 and 208 are also connected on the same side of the plate 202. When the tooth support cap 200 is installed onto one end of the flexible sleeve 118, for example, the end shown in FIG. 5, the dowels 208 and 210 are inserted into openings or bores extending through the axial length of the corresponding inner and outer rows of teeth until the plate 202 is flush with an end face of the flexible sleeve 118. It is noted that the term "dowel" does not indicate a shape for the structures described, which can have circular and non-circular cross sections, as are described for alternative embodiments herein.

More specifically, in the illustrated embodiment, an end face 128 of the flexible sleeve 118 has a generally annular shape defined between an outer periphery 130 and an inner periphery 132. The outer periphery 130 has a jagged shape that forms the outer row of teeth 114, which in the illustrated embodiment have a generally triangular shape that includes two inclined side faces 134 that meet at a peak 136 to form a convex tooth shape. Crests 138 separate adjacent teeth. Similarly, the inner periphery 132 has a jagged shape that forms the inner row of teeth 116, which also include inclined side faces 134 alternately disposed with crests 138 and peaks 136. As shown, the inner and outer teeth 116 and 114 are radially aligned in pairs along any radius, R, extending outwardly from the longitudinal axis.

As can be seen in FIG. 5, and the enlarged portion shown, each outer tooth 114 forms a bore 212. In this embodiment, the bore 212 has a circular cross section. The radial location of the bore 212 is offset from the outer periphery 130 and extends in an axial direction, i.e. parallel to the longitudinal axis L, through the tooth. The bore 212 can be placed close to the geometrical center of the tooth 114 such that the inclined side faces 134 extend tangentially to the bore 212 but at an offset distance, d1, therefrom, and the peak 136 is radially aligned with a center-point of the bore 212. Similarly, each inner tooth 116 forms a bore 214, which is also circular but at a smaller diameter relative to the bore 212 of each outer tooth 114.

The radial location of the bore 212 in each inner tooth 116 is offset from the inner periphery 132 and extends in an axial direction through the corresponding inner tooth 116. The bore 212 is also placed close to or on the geometrical center of the inner tooth 116 such that the inclined side faces 134 extend tangentially to the bore 212 but at an offset distance, d2, therefrom, and the peak 136 is radially aligned with a center-point of the bore 212. In general, the distances d1 and d2 are shown to be about the same in the embodiment of FIG. 5, which means that the bore 212 is formed somewhere along a radially extending centerline of each tooth, but can alternatively be selected to be different, for example, such that d1>d2 or d2>d1.

The shape of the plate 202 and, specifically, the inner and outer peripheries 204 and 206 are arranged to match the shape of the inner and outer peripheries 132 and 130 of the flexible sleeve 118. Moreover, the number and placement of the first plurality of dowels 208, and the diameter of each dowels 208, is selected to match the arrangement, placement, and size of the bores 212 formed in the outer plurality of teeth 114. Similarly, the number, placement, and size of the second plurality of dowels 210 is selected to match the arrangement, placement, and size of the bores 212 formed in the inner periphery of teeth 114.

When installing the tooth support cap 200 onto the end face 128, a layer of adhesive 216 may be spread over the face of the plate 202 and also along the lateral surfaces of the first and second pluralities of dowels 208 and 210 before the cap 200 is installed onto the end face 128. When the cap 200 is in an installed position onto the end face 128, the side of the plate 202 from which the dowels 208 and 210 extend is flush or abuts onto the end face 128, and the dowels 208 and 210 extend through the corresponding teeth 114 and 116. In the embodiment shown in FIG. 3, for example, chamfered tips 218 of the dowels 208 and 210 extend past end openings in the outer teeth 114.

Figure 7B:
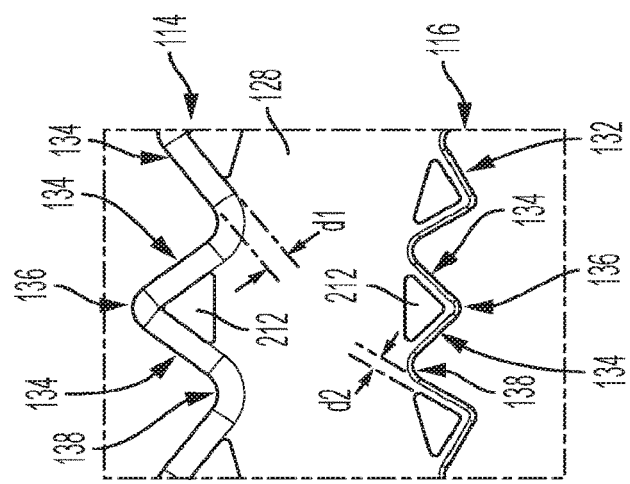
FIG. 7B is an enlarged detail view of a portion of FIG. 7A.
Figure 7A:
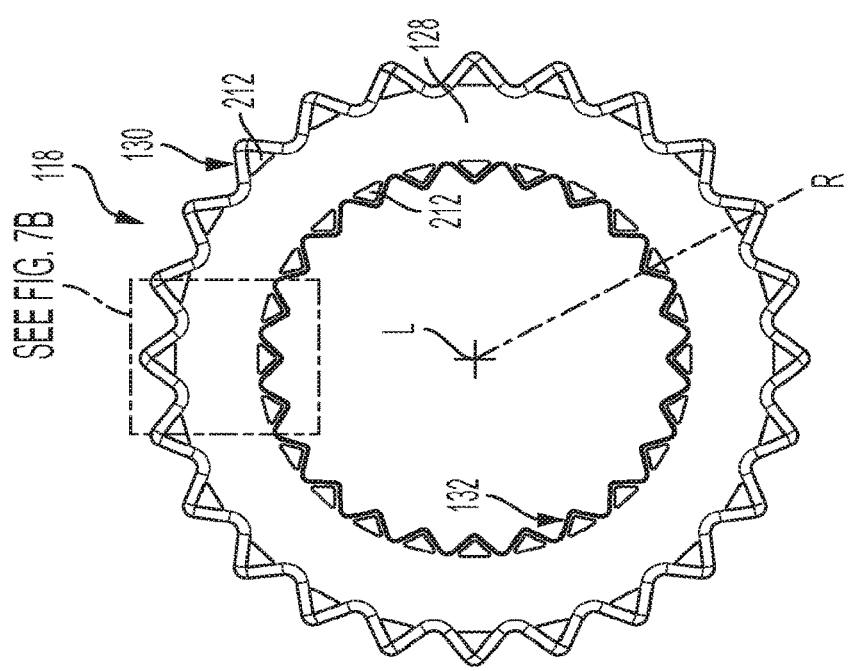
FIG. 7A is an outline view from a top perspective of a flexible sleeve in accordance with the alternative embodiment.
Figure 6:
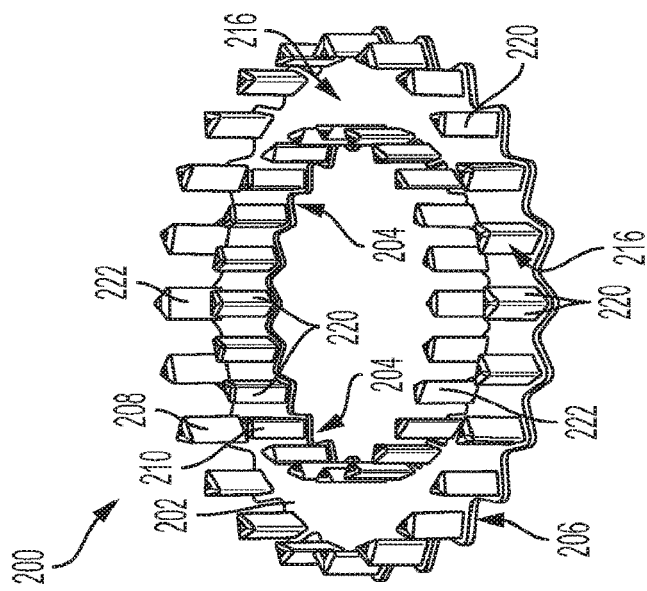
FIG. 6 is an outline view of a tooth support cap in accordance with an alternative embodiment in accordance with the disclosure.

An alternative embodiment for the flexible sleeve 118 and tooth support cap 200 is shown in FIGS. 6 and 7. In these figures, structures and features that are the same or similar to corresponding structures and features described previously are denoted and referred to by the same reference numerals as previously used for sake of description.

In this embodiment, the shape of the dowels 208 and 210 is non-circular in cross section. It should be noted that the shape of the dowels is contemplated to have any appropriate shape, for example, triangular as shown here but also other shapes, including but not limited to semi-circular, C-shaped, Y-shaped, T-shaped, X-shaped, l-shaped, V-shaped, star shaped, rectangular, hexagonal, pentagonal, wave-shaped, and others. Shape selection may depend on various factors including the desired contact area between the dowels and their bores, the material of the dowels, the material of the flexible sleeve, the amount and type of adhesive used between the dowels and their corresponding bores, the manufacturing method used to construct the cap, and others. The cap may be constructed by any sufficiently rigid material including a thermoplastic material, nylon (including glass-filled nylon), metal, fiberglass composites, and the like.

While various features in the embodiment shown in FIGS. 6 and 7 are similar to the embodiment shown in FIGS. 4 and 5 with respect to the general arrangement of components, it can be seen that here the shape of the dowels 208 and 210 is triangular rather than circular. Consequently, the bores 212 also have a triangular shape that mates with the shape of the dowels 208 and 210. Because of this difference, a different type of support may be lent by the dowels to the outer and inner peripheries of the flexible sleeve 118 and the end face 128. More specifically, where a tangential relationship exists between the inclined side faces 134 and the outer surface of the dowels 208 and 210 having a minimum thickness d1 or d2 in the embodiment shown in FIG. 5, the triangular dowels 208 and 210 of the embodiment shown in FIGS. 6 and 7 includes an orientation of the dowels such that side faces 220 of the dowels 208 and 210 are orientated to be generally parallel with the inclined side faces 134 of the inner and outer teeth 116 and 114. The distances d1 and d2 thus denote a layer of flexible material that has a uniform thickness over each side face 220 of the dowels 208 and 210 and provides a more reliable cushioning effect that, in certain applications, may avoid possible pinch points in embodiments with a non-uniform bore wall thickness between the dowel and an exterior surface of the tooth. In this embodiment, the third face 222 of each dowel 208 or 210 lies generally tangentially relative to the end-face 128.

Figure 8:
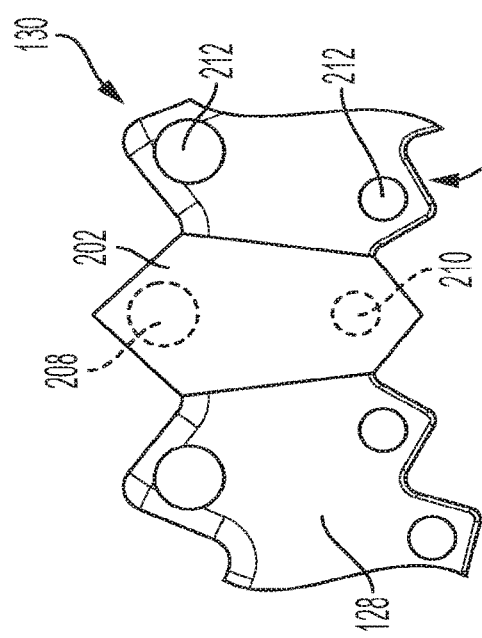
FIG. 8 is a partial view of a flexible sleeve having a tooth support.
Figure 10:
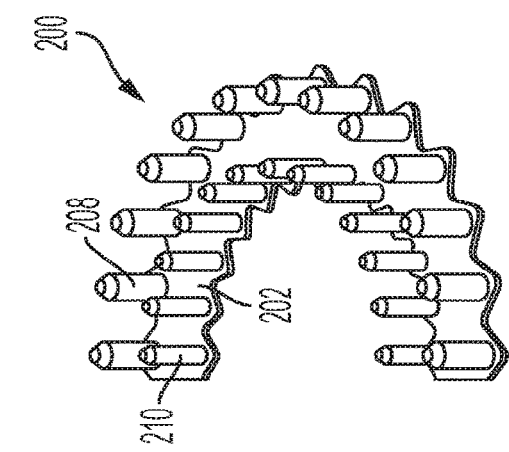
FIG. 10 is an outline view of a partial tooth support in accordance with the disclosure.
Figure 9:
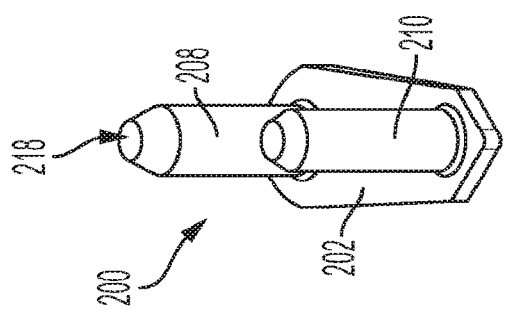
FIG. 9 is a view of the tooth support, in accordance with the disclosure.

An alternative embodiment is shown in FIGS. 8, 9, and 10, which are all variations in the arrangement of structures of the embodiment shown in FIGS. 4 and 5, but can alternatively be formed as variations of any other embodiment described herein, including the embodiment shown in FIG. 6. As can be seen here, where the plate 202 in the embodiment of FIG. 4 is generally annular and extends peripherally around the entire circumference of the end face 128, in the embodiment of FIG. 9, the plate is reduced to a pie segment that covers one set of teeth 114 and 116, and includes thereon one set of dowels, i.e. a single dowel from the first and second pluralities of dowels 208 and 210. It is envisioned that a plurality of such plates 202 can be assembled in succession around the periphery of the end face 128 of the flexible sleeve 118, on both axial ends, such that all bores 212 are occupied by a dowel 208 or 210 when the flexible member assembly 108 is complete and installed within a pair of hubs 102. In one embodiment, the plate 202 may be omitted entirely such that individual dowels 208 and 210 may be assembled into corresponding bores 212 in the inner and outer rows of teeth 114 and 116. In such an embodiment, a set of dowels such as those shown in FIG. 4 or FIG. 6 would be loosely provided and inserted, one dowel into each corresponding bore.

As can be appreciated, a range of different spans of the cap 200 can be used anywhere between a single pair of dowels, as shown in FIG. 9, to a full set of dowels extending around the entire end face, as shown in FIG. 4. For example, as shown in FIG. 10, the cap 200 is generally half-circle shaped and extends over a span of 180 degrees around the end face. The different spans can be used to cover the entire face of a solid flexible coupling, and also alternative types of couplings that are commonly used including a split coupling having a slit on one side, or a fully split coupling having slits on both sides such that the coupling is formed by two semi-cylindrical pieces assembled together to form a full cylindrical coupling. The cap as shown in FIG. 10 would thus occupy half the bores 212 and would be mounted adjacent a mating pair cap to occupy and cover the remaining bores. Other span angles may also be used. It is also noted that the inner periphery 132 of the embodiments for the caps 200 shown in FIGS. 9 and 10 may alternatively be formed to be smooth, and the inner row of dowels 210 may be omitted such that the caps may be installed from the opposite direction shown in FIG. 3 to occupy the bores 212 in the outer row of teeth 114. In addition, it is contemplated that two opposed plates 202, appropriately sized, can be connected at least to the outer row or dowels 208 such that both axial faces of the teeth 114 on each side of the flexible sleeve 118 can be faced by the plates 202.

Figure 12:
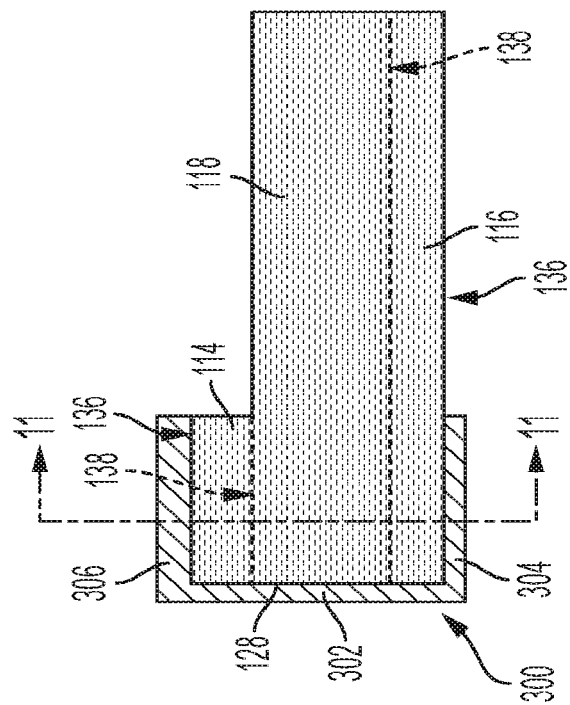
FIGS. 11 and 12 are partial section views from different perspectives of an alternative embodiment in accordance with the disclosure.
Figure 11:
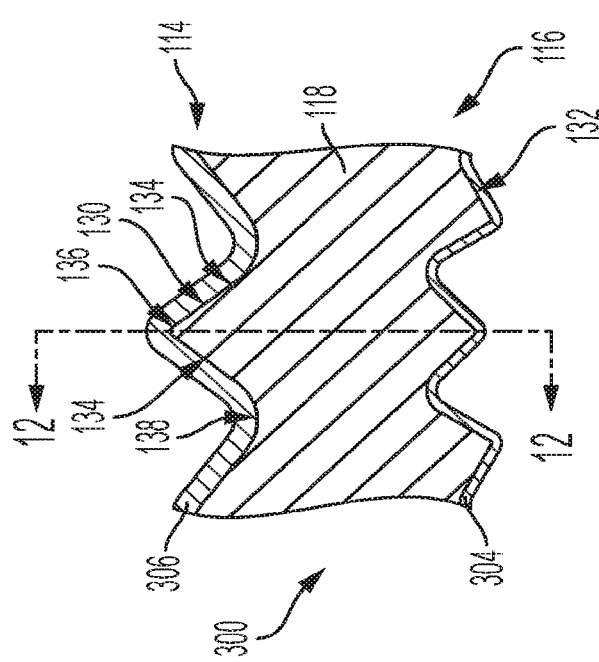

An additional embodiment for a cap 300 is shown in FIGS. 11 and 12 in partial cross section. In this embodiment, the cap 300, which may also include dowels 208 and 210 (not shown), includes an outer peripheral wall 306 and an inner peripheral wall 304 that extend parallel to one another and on the same side away from a plate 302 in the axial direction. The plate 302, and the outer and inner peripheral walls 306 and 304 encapsulate an end portion of the flexible sleeve, including the teeth formed thereon. As shown, the walls 306 and 308 have a jagged edge in cross section that follows the inner and outer peripheries 130 and 132 of the end face 128 to form the outer surfaces of the inner and outer teeth 116 and 114. In this way, the cap 300 reduces or eliminates flexing of the teeth 114 and 116 during use and may be adhered to the end face 128 and teeth 114 and 116. In applications where the hubs 102 have a rough-surface finish, for example, hubs made from cast iron, the cap 300 may be made from a rigid but compliant material such as vinyl, poly-vinyl-chloride (PVC), poly-ethylene-terephthalate (PET), and/or other thermoplastic or polymer materials, which can facilitate installation of the cap 300 into the engagement portion 106 of the hub 102.

Use of any of the caps described herein to stiffen the teeth formed on the axial ends of a flexible sleeve, which meshably engage with hubs disposed on shafts, has proven to considerably increase the torque capacity of a flexible coupling as compared to a baseline coupling, i.e. a coupling with no caps disposed on the ends of the flexible coupling. To quantify this torque capability increase in exemplary implementations, certain experiments were performed. The purpose of the experiments was to quantify the torsional stiffness and the increased performance of different varieties of stiffening caps in accordance with the disclosure as compared to a baseline coupling. A D-flex coupling was used as a baseline and also modified for the testing. One of the metrics examined were increases in terms of torque required to shear the teeth of the flexible element being tested. The scope of the test conducted on the baseline and improved couplings was to statically test the improved coupling designs to identify torsional stiffness, quantify tooth shear strength, and baseline them against the baseline design, which did not include any stiffening structures in the teeth.

Three different prototype designs were tested and compared to the baseline design. A first prototype design, designated P1, included round dowels such as the dowels 208 and 210 shown in FIG. 4, but without adhesives applied to retain the dowels in the rubber material of each tooth, and also without the plate 202. The dowels were inserted into both sides of the sleeve. To increase the strength of the teeth, each tooth on the ID and OD of a sleeve end face were drilled to allow for a dowel to be inserted. Various sizes of dowels were inserted into the OD and ID teeth. The steel dowels were only held in place by the press fit between the rubber and dowel. In the illustrated embodiment, each dowel has a cross sectional area size that is about 33% of the cross sectional area size of the corresponding tooth, but it should be appreciated that the cross sectional area size of each tooth that is occupied by a dowel may be selected depending on the type of material used for the flexible sleeve and the dowel, the expected loading on the flexible sleeve, the operating environment, and other parameters. For most applications, the ratio of the cross-sectional area of the dowel over the area of the tooth can be anywhere between 5% and 50%.

A second prototype design, designated P2, used a cap 200 (FIG. 4), which was manufactured using an elastomeric material formed in a three-dimensional printer. The dowels on the cap were dimensioned the same as P1. A third prototype design, designated P3, was made with two caps identical to P2 inserted on both sides of the flexible sleeve, with the addition of an adhesive added along the dowels and the plate on both sides to bond the cap to the flexible sleeve.

Torsional stiffness was completed on each of the prototypes by rotating the element to its maximum wind-up angle and recording the resultant torque. This was repeated multiple times and the results were averaged to yield a final value. For the test setup, shafts were installed on each of the driven and driver chucks of a torsion machine, and a flexible element was placed between the driver and driven end flanges to mimic an in-service configuration. A maximum acceptable angular misalignment was also introduced between the two shafts.

Once a baseline torsional stiffness was established for each of two control samples and three test samples, as described above, a tooth shear test was conducted on each of the five tested assemblies by steadily twisting the element until the teeth of the element roll over and jump teeth on the flange. The boundary condition for determining tooth slip was a drop in torque sufficient to identify when the tooth sheared and jumped.

The results from the Tooth Shear tests performed on two samples of the baseline design, designated as B1 and B2, and on the three prototypes P1, P2, and P3 are shown in Table 1 below:

TABLE 1

Torsional Stiffness and Tooth Shear Results

| Sample | Percent increase over control |
|--------|-------------------------------|
| B1     | X                             |
| B2     | X                             |
| P1     | 52.2%                         |
| P2     | 5.8%                          |
| P3     | 33.2%                         |

Following the tests, it was observed that all three samples outperformed the control samples. For example, P1 succeeded in increasing the stiffness of the element teeth and resulted in a 52% increase in tooth shear capacity. Additionally, the reinforced teeth essentially eliminated the jumping of teeth on the flange. The drop in torque occurred as the teeth tore and the reinforcements fell out. In addition to the increased static torque capacity, the tooth reinforcements did not overly change the torsional stiffness of the element, as there was only a 5% change in torsional stiffness of the reinforced elements to the two control elements, and the torsional stiffness remained within +/−20% of the catalog value. The test on P2 did not perform as well as P1. The stiffening cap on P2 provided some support to the teeth and increased the angle at which the teeth jumped. However, the cap began pulling away from the sleeve element at the high angle of twist, which reduced the stiffness of the teeth and allowed them to substantially deform.

P3 performed better than P2 but did not achieve the same torque ratings as P1. It is theorized that this was most likely due to the reduced stiffness caused by the 3D printing used to manufacture the stiffening cap. The bonding between the cap and the rubber material of the sleeve eliminated the separation from the element at high angle of twist. Additionally, the bonded cap of P3 increased the angle at which the element slipped in the flange.

The torsional stiffness of P3, however, was nearly identical to that of the two control elements. This concept provides the opportunity for torsionally softer elements to operate at higher torques while still providing high levels of vibration absorption and misalignment capacity. Continuously stiffening elements to achieve high torque ratings will ultimately result in reduced misalignment capacity and reduced absorption capabilities. Additionally, there was no sign of tearing or damage to the P3 element once the tooth shear test was completed, which allowed the same element to be reused for additional testing.

The additional testing performed on P3 included a dynamic misalignment test, which subjected the sample to twice the normal catalog rating for a sleeve coupling and at normal motor operating speed. The test station was intentionally misaligned to a worst-case condition for the element. Under these conditions, the P3 prototype lasted substantially longer than the control samples B1 and B2. These results represent an unexpected increase of 10,000% for the dynamic performance of the element.

It is believed that these tests illustrate that tooth reinforcements have the potential to increase the torque capacity of sleeve coupling elements without impacting the torsional stiffness or the formulation of the base rubber compound. Additionally, these tooth reinforcements could be any material that has a substantially higher durometer/stiffness than the base rubber material. Urethane, plastics, rubber, or other metals could be used. Further consideration should be given in terms of the actual shape of the reinforcement in addition to circular shapes, which were the only shapes tested. A triangular shape that mimics the profile of the tooth, such as the embodiment shown in FIG. 6, may further provide reinforcement in higher torque situations. Additionally, it is recommended to use a high durometer material to provide improved stiffness.

All references, including publications, patent applications, and patents, cited herein are hereby incorporated by reference to the same extent as if each reference were individually and specifically indicated to be incorporated by reference and were set forth in its entirety herein.

The use of the terms "a," "an," "the," "at least one," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e. meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flexible member assembly for use with a flexible coupling, the flexible coupling including two hubs, each hub configured to engage a shaft along a central portion and engage the flexible sleeve along an engagement portion, the flexible member assembly comprising:
   a flexible sleeve;
   a first plurality of dowels attached to a first end of the flexible sleeve, the first plurality of dowels adapted to be disposed between the flexible sleeve and the engagement portion of one of the two hubs of the flexible coupling and
   a second plurality of dowels attached to a second end of the flexible sleeve, the second plurality of dowels adapted to be disposed between the flexible sleeve and the engagement portion of the other of the two hubs, wherein the engagement portion of each hub comprises an inner row of teeth and an outer row of teeth concentrically disposed with one another with respect to a longitudinal axis, and wherein the flexible sleeve includes mating inner and outer rows of teeth formed at either axial end thereof, the inner and outer rows of teeth adapted to mesh with the inner and outer rows of teeth of the engagement portion of each of the two hubs.

2. The flexible member assembly of claim 1, wherein the first plurality of dowels is part of a first stiffening cap and the second plurality of dowels is part of a second stiffening cap, each of the first stiffening cap and the second stiffening cap comprising:
   a plate having a generally annular shape that includes an inner periphery and an outer periphery;
   wherein the first plurality of dowels is connected to the plate and arranged around and proximal the outer periphery and/or the inner periphery; and
   wherein the second plurality of dowels is connected to the plate and arranged around and proximal the outer periphery and/or the inner periphery.

3. The flexible member assembly of claim 2, further comprising a first plurality of bores extending, one each, through the outer row of teeth of the flexible sleeve, wherein the first plurality of dowels extends, one each, through the first plurality of bores, and a second plurality of bores extending, one each, through the inner row of teeth of the flexible sleeve, wherein the second plurality of dowels extends, one each, through the second plurality of bores.

4. The flexible member assembly claim 3, further comprising an adhesive disposed at least partially along interfaces between the first and second stiffening caps and the flexible sleeve.

5. The flexible member assembly of claim 3, wherein each of the first plurality of bores extends through a geometrical center of each of the outer row of teeth, and each of the second plurality of bores extends through a geometrical center of each of the inner row of teeth.

6. The flexible member assembly of claim 1, wherein each of the first plurality of dowels and the second plurality of dowels comprise at least one dowel having a non-circular cross section.

7. The flexible member assembly of claim 1, wherein the first plurality of dowels is part of a first stiffening cap and the second plurality of dowels is part of a second stiffening cap, each of the first stiffening cap and the second stiffening cap comprising:
   a plurality of plate segments having a generally curved shape that includes an inner portion and an outer portion with respect to a radial direction that is transverse to the longitudinal axis;
   wherein the first plurality of dowels is connected to the plurality of plate segments and located proximal to the outer portion;
   wherein the second plurality of dowels is connected to the plurality of plate segments and located proximal to the inner portion; and
   wherein the plurality of plate segments are arranged to cover an entire periphery of an end face of the flexible sleeve.

8. The flexible member assembly of claim 1, wherein the first plurality of dowels is part of a first stiffening cap and the second plurality of dowels is part of a second stiffening cap, each of the first stiffening cap and the second stiffening cap comprising:
   a plate having a generally annular shape that includes an inner periphery and an outer periphery;
   an outer peripheral wall extending along the outer periphery; and
   an inner peripheral wall extending along the inner periphery;
   wherein the plate, the outer peripheral wall, and the inner peripheral wall of the first stiffening cap encapsulate the first end of the flexible sleeve, and the plate, the outer peripheral wall, and the inner peripheral wall of the second stiffening cap encapsulate the second end of the flexible sleeve.

9. The flexible member assembly of claim 1, wherein the second plurality of dowels have a first row of dowels that extend around the second end adjacent an outer periphery of the second end and a second row of dowels that extend around the second end adjacent an inner periphery of the second end.

10. The flexible member assembly of claim 1, wherein the first plurality of dowels have a first row of dowels that extend around the first end adjacent an outer periphery of the first end and a second row of dowels that extend around the first end adjacent an inner periphery of the first end.

* * * * *